Aug. 19, 1952 H. K. RICHARDS 2,607,818

THERMOSTATICALLY CONTROLLED CRYSTAL UNIT

Filed Feb. 17, 1949

INVENTOR.
Hans Kohn-Richards
BY
Forman L. Mueller
Atty.

Patented Aug. 19, 1952

2,607,818

UNITED STATES PATENT OFFICE 2,607,818

THERMOSTATICALLY CONTROLLED CRYSTAL UNIT

Hans Kohn Richards, Chicago, Ill., assignor to Motorola, Inc., Chicago, Ill., a corporation of Illinois Application February 17, 1949, Serial No. 76,933

10 Claims. (Cl. 171—327)

This invention relates to piezoelectric crystals, and particularly to improved means for regulating the temperature of a piezoelectric crystal.

As is well known, the frequency of oscillation of a piezoelectric crystal is affected by the temperature of the crystal, and for accurate frequency control, it is desirable that the crystal temperature be maintained very nearly constant. This may be accomplished by operating the crystal at a temperature above the ambient temperature and employing a thermostatically controlled, electric heating element for furnishing heat as needed to the crystal. This heating element and its controlling thermostatic switch are placed in a small enclosure with the crystal. The heating element heats both the switch and the crystal, and when the switch attains a predetermined temperature, it opens the circuit through the heating element. When the temperature of the switch falls to a predetermined value, the switch closes the circuit to the heating element.

The successful operation of a thermostatically controlled crystal unit depends upon how closely the temperatures of the thermostatic switch and the crystal correspond to each other at each instant. In prior arrangements there has been a tendency for the crystal temperature to change at a different rate than the temperature of the switch, and usually the change in the switch temperature has lagged behind the change in the crystal temperature. This has resulted in undesirable fluctuations of the crystal temperature.

An object of the present invention is to provide an improved crystal unit of the aforesaid character in which the respective temperatures of the thermostatic switch and the crystal are at all times equal to each other.

Another object is to make the respective rates of heat transfer from the heating element to the crystal and to the thermostatic switch such that the respective temperatures of the crystal and switch change simultaneously and to equal extents.

A further object is to reduce materially the heat transfer between the equipment in which the crystal unit is used and the crystal unit itself, without impairing the necessary electrical connections to such unit.

A feature of the invention is the provision of individual holders for the crystal and the thermostatic switch, which holders are so designed that the temperatures of the switch and the crystal change simultaneously and at the same rate while the heating element is being operated. The holders also serve to equalize the drops in temperature of these parts when the heating element is not operating.

Another feature is the provision of sockets for the holders inside of the unit housing and separate from the base of the housing. The housing base has pins adapted for insertion into a female socket, and these pins are electrically connected to the sockets for the holders by very thin wires which conduct substantially no heat.

The foregoing and other objects, features and advantages of the invention will be better understood by reference to the following description taken in connection with the accompanying drawing, wherein.

Figures 1, 2, 3, 4, 5:
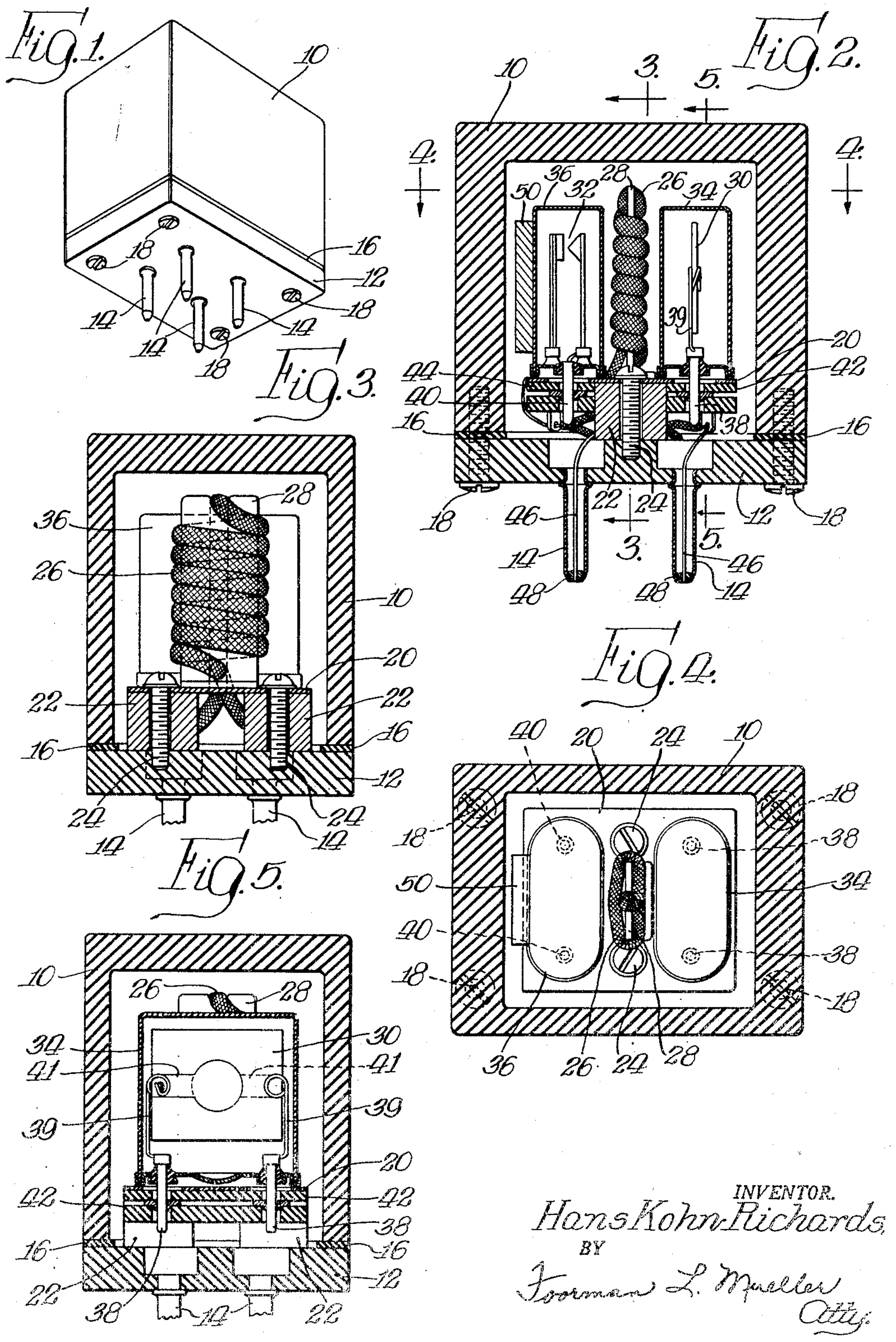
Fig. 1 is a bottom perspective view of a thermostatically controlled crystal unit constructed in accordance with the principles of the invention.
Fig. 2 is a longitudinal sectional view of the unit.
Fig. 3 is a cross-sectional view of the unit taken on the line 3—3 of Fig. 2.
Fig. 4 is a horizontal section taken on the line 4—4 of Fig. 2.
Fig. 5 is a cross-sectional view taken on the line 5—5 of Fig. 2.

In practicing the invention, the component parts of a thermostatically controlled crystal unit, namely, the crystal, electric heating element and thermostatic switch, are disposed within a housing which has both electrical and heat insulating properties. The crystal and the thermostatic switch are separately enclosed by individual holders or cans which are mounted in sockets on opposite sides of the heating element. The sockets for the holders are carried by a small base within the unit which is spaced from the base of the housing. The housing base has pins through which external connections to the unit are made. Fine wires connect these pins to the terminals of the sockets for the thermostatic switch and the crystal, so that substantially no heat transfer takes place by conduction through the pins of the unit. The holders are of similar configuration, except that one of the holders may be provided with a fin of heat-conductive material to accelerate the transfer of heat to or from the interior of that holder. The thermostatic switch, which tends to heat more slowly than the crystal, may be placed in a holder of this character so as to equalize the temperature changes of the switch and crystal.

Referring now to the drawing, the unit is enclosed by a housing 10 of rectangular configuration having a separate base 12 to which are secured pins 14 that are receivable in a standard female socket (not shown). The housing 10 and its base 12 are made of suitable insulating material having sufficient thickness to act as a good heat insulator. A resilient gasket 16 is interposed between the base 12 and the mouth of the housing 10, and the base 12 is secured to the housing 10 by screws 18.

Inside the housing 10 there is a small plate or base 20, which may be a piece of flat metal mounted on spacers 22 and secured to the upper side of the base 12 by screws 24. An electric heating element 26 comprising insulated resistance wire is positioned centrally on the base 20. As shown in Figs. 2, 3 and 4, the heating element 26 is wound on a metallic plate 28 which extends vertically from the plate 20. It is contemplated also that the heating element may be formed of enameled wire wound on a ceramic support. This element 26, when energized, serves to heat the contents of the housing 10.

Disposed on opposite sides of the heating element 26 are a piezoelectric crystal 30 and a thermostatic switch 32. The switch 32 has a bimetallic actuating arm which flexes in response to temperature changes of the switch. The crystal 30 and the switch 32 are respectively enclosed in individual holders 34 and 36 which consist of small metallic cans or containers through which heat can be transferred to the crystal 30 and switch 32. Electrical connections to the crystal 30 and switch 32 are made through the medium of small insulated pins 38 and 40, respectively, extending from the bottoms of the cans 34 and 36. The pins 38 and 40 are respectively received by small sockets 42 and 44 secured to the underside of the plate 20, as shown in Figs. 2 and 5. The crystal is freely mounted by wires 39 secured to the pins 38, which wires engage the electrodes 41 of the crystal for making electrical connections thereto.

Electrical connections are made from the terminals of the sockets 42 and 44 to the pins 14 by fine wires 46. This arrangement reduces the heat transfer through these electrical conductors to a negligible amount. Preferably, the pins 14 are hollow, and the wires 46 are secured to the lower ends of these pins by drops of solder 48. The base plate 20 is supported on the base 12 in such a manner that heat is not readily conducted therebetween.

The holders 34 and 36 are of substantially identical configurations and are positioned symmetrically with respect to the heating element 26. The heating element 26, therefore, tends to heat the holders 34 and 36 and their respective contents uniformly. However, if there should be any tendency for the thermostatic switch 32 to heat more slowly than the crystal 30, this condition may be corrected by adding a small heat-conductive fin as 50, Figs. 2 and 4, to the holder 36, this fin 50 being secured directly to the outside of the holder 36. The design is such that the temperatures of the switch 32 and the crystal 30 change simultaneously and equally so that these temperatures are the same at all times.

Inasmuch as the switch temperature exactly corresponds to the crystal temperature at each instant, an extremely accurate control over the crystal temperature is possible. This accuracy far exceeds that obtained previously with known types of crystal units. The holders 34 and 36 also serve to seal the crystal 30 and switch 32 against vapor condensation and other impurities. Either the crystal or the switch or both may be replaced by removing the respective holder and plugging in a new one.

While the invention has been described with reference to a preferred embodiment thereof, modifications of such embodiment may be possible without departing from the principles set forth above, and it is intended that all such modifications shall be included within the scope of the appended claims.

I claim:

1. A piezoelectric crystal unit comprising a piezoelectric crystal, a heating element disposed near said crystal, a temperature-controlled switch for controlling the flow of current through said heating element, said switch being disposed near said heating element, and individual enclosures for said crystal and said switch having substantially the same heat transfer characteristics, said crystal and said switch being positioned symmetrically with respect to said heating element so that the temperatures of said crystal and said switch are maintained the same at all times.

2. A piezoelectric crystal unit comprising a piezoelectrical crystal disposed in a space which is subjected to temperature variations, a thermostatic switch disposed in said space, heat-conductive containers of substantially identical construction respectively enclosing said switch and said crystal, and an electric heating element controlled by said switch and disposed in said space outside of said two containers for affecting the temperatures of said switch and said crystal, said containers determining the rate of heat transfer from said heating element to each of said crystal and said thermostatic switch whereby there is substantially no difference between their temperatures at any given instant.

3. A piezoelectric crystal unit comprising an enclosure, and the following elements housed by said enclosure: a piezoelectric crystal, a thermostatic switch, an electric heating element controlled by said switch and positioned to affect the temperatures of said switch and said crystal, and metallic parts constituting heat-transfer paths between said heating element and each of said crystal and said switch, said paths being proportioned in relation to the respective heat-absorbing capacities of said crystal and said switch whereby the temperature of said switch is caused to vary equally and simultaneously with the temperature of said crystal.

4. In a piezoelectric crystal unit which includes an electric heating element arranged to heat a piezoelectric crystal and a thermostatic switch, the combination with said switch and said crystal of metallic cans separately enclosing said crystal and said switch for modifying the transfer of heat thereto from the heating element, the can for said switch having a heat-conductive fin thereon whereby heat is transferred to said switch at a rate sufficient to maintain the switch temperature equal at all times to the crystal temperature.

5. In a piezoelecric crystal unit having an electric heating element therein, the combination of a pair of heat transfer members having sealed enclosure portions disposed closely adjacent to and on opposite sides of said heating element, a thermostatic switch enclosed by said sealed portion of one of said heat transfer members for controlling the energization of the electric heating element, and a piezoelectric crystal enclosed by said sealed portion of the other one of said heat transfer members.

6. A piezoelectric crystal unit comprising a flat base, a heating element including a coil of wire wound on a support member extending normal to said base, a pair of sockets on said base disposed on opposite sides of said support member, a thermostatic switch controlling said heating element, a metallic can enclosing said switch, a piezoelectric crystal, a second metallic can enclosing said piezoelectric crystal, said cans having insulated pins received respectively by said socket for establishing electrical connections to said switch and said crystal, said cans also being heat-conductive for transferring heat from said heating element to said switch and to said crystal.

7. In a piezoelectric crystal unit having a thermostatic switch and a crystal unit included therein, the combination of a housing, a base within said housing, an electric heating element supported by said base, and a pair of sockets supported by said base on opposite sides of said heating element, said sockets being respectively adapted to receive the thermostatic switch and the piezoelectric crystal.

8. A piezoelectric crystal unit comprising an insulated housing having a base, a pair of sockets supported by said base, an electric heating element disposed between said sockets within said housing, a pair of small metallic containers, a thermostatic switch enclosed by one of said containers for controlling said heating element, a piezoelectric crystal enclosed by the other of said containers, said containers having pins extending therefrom adapted to be received by said sockets for establishing electrical connections to said switch and to said crystal.

9. A piezoelectric crystal unit comprising an insulated housing having a base, pins secured to said base for making electrical connections to said unit, a second base supported by said housing base and disposed in spaced relation thereto within said housing, a pair of sockets supported by said second base, a thermostatic switch, a holder for said switch receivable in one of said sockets, a piezoelectric crystal, a holder for said crystal receivable in the other of said sockets, an electric heating element supported by said second base intermediate said holders, said heating element being controlled by said switch for heating said crystal, and fine wires affording the sole connections from said sockets to said pins, thereby to minimize heat losses through said pins.

10. A piezoelectric crystal unit including in combination, a housing, an electric heating element within said housing, heat transfer means within said housing having a pair of sealed enclosure portions disposed closely adjacent to and on opposite sides of said heating element, a thermostatic switch enclosed by one of said sealed enclosure portions for controlling the energization of the electric heating element, and a piezoelectric crystal enclosed by the other one of said sealed enclosure portions, said heat transfer means modifying the transfer of heat from said heating element to said switch and said crystal so that the temperatures thereof remain substantially the same.

HANS KOHN RICHARDS.

REFERENCES CITED

The following references are of record in the file of this patent:

UNITED STATES PATENTS

| Number | Name | Date |
|---|---|---|
| 2,301,007 | Baldwin | Nov. 3, 1942 |
| 2,413,579 | Pennybacker | Dec. 31, 1946 |
| 2,438,345 | Miller | Mar. 23, 1948 |
| 2,470,134 | Bitner | May 17, 1949 |